No. 886,518. PATENTED MAY 5, 1908.
M. KLEMENTIS & J. SEBASTIAN.
GRAIN HEATER.
APPLICATION FILED SEPT. 6, 1907.

3 SHEETS—SHEET 1.

WITNESSES
H R Weigle
B. Zeitz

INVENTORS
Michael Klementis
John Sebastian
by Robt. Klotz
atty.

No. 886,518. PATENTED MAY 5, 1908.
M. KLEMENTIS & J. SEBASTIAN.
GRAIN HEATER.
APPLICATION FILED SEPT. 6, 1907.

3 SHEETS—SHEET 3.

WITNESSES
H R Weigle
B. Zeitz

INVENTORS
Michael Klementis
John Sebastian
by Robt Klotz
Atty.

UNITED STATES PATENT OFFICE.

MICHAEL KLEMENTIS AND JOHN SEBASTIAN, OF CHICAGO, ILLINOIS.

GRAIN-HEATER.

No. 886,518.  Specification of Letters Patent.  Patented May 5, 1908.

Application filed September 6, 1907. Serial No. 391,599.

*To all whom it may concern:*

Be it known that we, MICHAEL KLEMENTIS and JOHN SEBASTIAN, citizens of the United States, and residing at Chicago, in the county of Cook and State of Illinois, have invented a new and useful Improvement in Grain-Heaters, of which the following is a complete specification.

This invention relates to improvements in grain heaters and more particularly to a grain heater adapted to heat the grain preparatory to grinding.

The object of this invention is to provide a device by means of which grain may be subjected to heat for a sufficient period before grinding to drive off any excess of moisture that may be contained therein.

It is a further object of the invention to provide a device in which the grain in its passage therethrough is alternately thrown from one heating surface to the other and across a heated area, so that, although it takes but a brief interval for the grain to pass through the machine, the heat has ample opportunity to absorb the moisture and raise the temperature without unduly heating or scorching it.

It is also an object of the invention to provide a device adapted to be so regulated that the grain may be subjected to the heat for a greater or less interval, dependent upon the amount of moisture contained therein.

The invention consists of the matters hereinafter described in the specification and more fully pointed out and defined in the appended claims.

Figure 1:
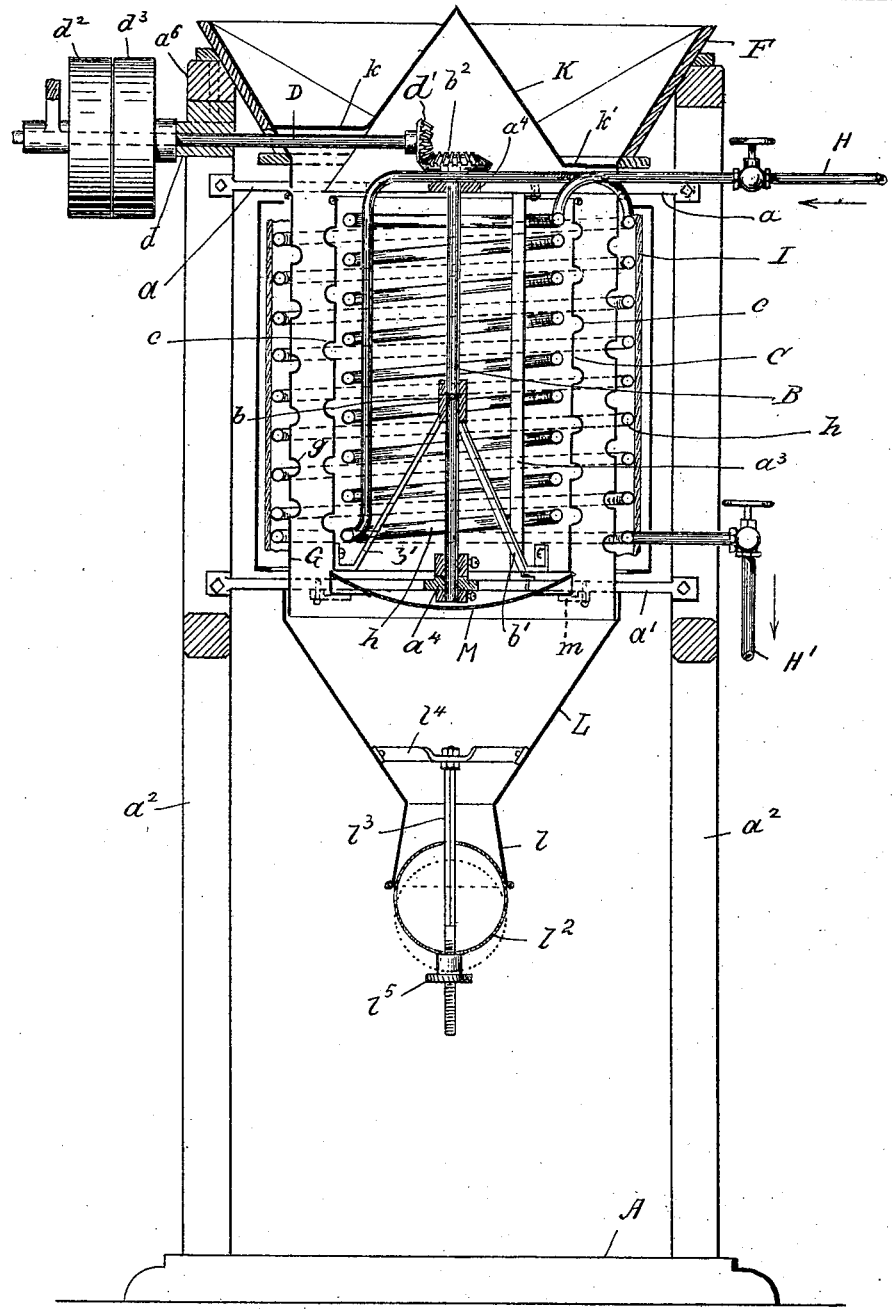
Figure 2:
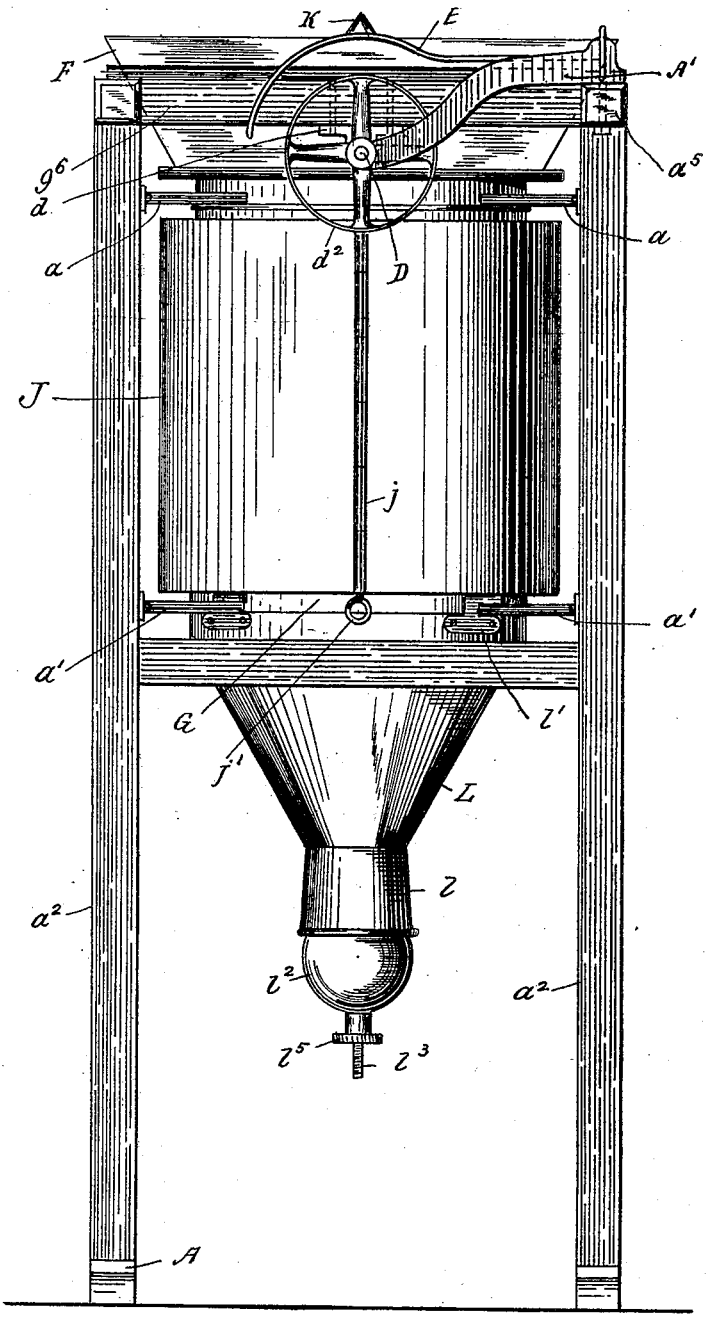
Figure 3:
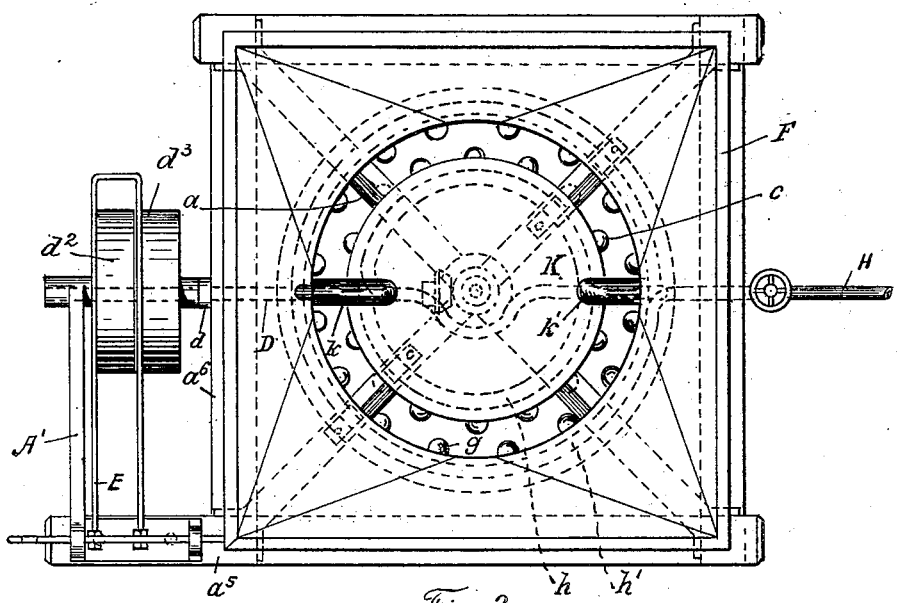
Figure 4:
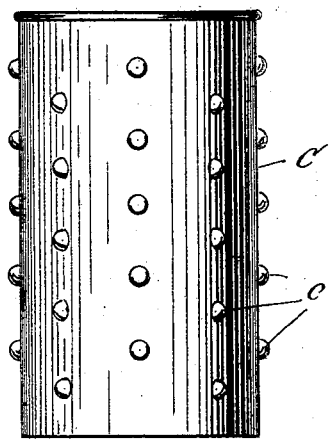
Figure 5:
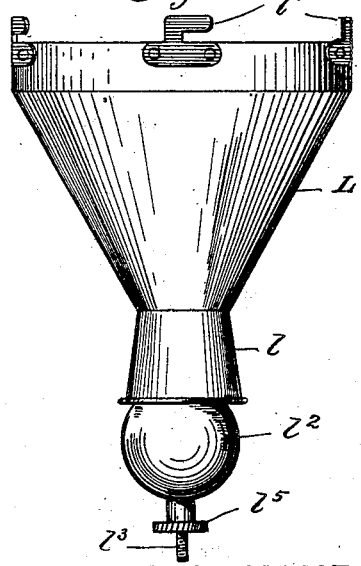

In the drawings: Figure 1 is a vertical section of a device embodying our invention. Fig. 2 is a side elevation of the same. Fig. 3 is a top plan view thereof. Fig. 4 is a side elevation of the rotatable cylinder. Fig. 5 is a side elevation of the discharge hopper and regulating valve therefor.

As shown in said drawings: A indicates a frame of any desired material and construction, such as wood, which is preferably rectangular in shape, and is provided near its top with upper and lower pairs of bars $a$ and $a'$ which are engaged at their ends to the legs $a^2$ and extend diagonally across the frame. The bars of each pair are united at the center of the frame and are braced vertically by uprights $a^3$ which are engaged at their ends to the upper and lower bars. Said bars are provided at their centers with bearings $a^4$ in which is journaled the vertical shaft B. Said shaft is provided centrally with a collar $b$ to which are engaged downwardly and laterally directed arms $b'$ which extend downwardly to near the bars $a'$. A revolving cylinder C, having a plurality of outwardly directed projections $c$ thereon, which may be arranged in any desired manner, is engaged at its lower end to the lower ends of the arms $b'$ and extends upwardly to near the upper bars $a$.

One of the top members, $a^5$, of the frame is extended at one end beyond the frame and a bearing arm A' is engaged to the end thereof and projects along side of the frame to near the center thereof. A shaft D is journaled in a bearing on the end of said arm and in a suitable bearing $d$ engaged beneath the top member $a^6$ of the frame, and is provided on its inner end with a beveled pinion $d'$ adapted to mesh with a beveled gear $b^2$ on the upper end of the shaft B. Said shaft is provided with the usual fixed and loose belt pulleys $d^2$ and $d^3$, and a belt shifter E of any preferred construction is slidably mounted on the member $a^5$.

A hopper F of any preferred construction is seated in the top of the frame and an outer cylinder G, having inwardly directed projections $g$ thereon, extends downwardly therefrom and is supported on the bars $a$ and $a'$.

A pipe H, for steam or other heating fluid, leads from any suitable source of supply and enters the top of the cylinder C and is coiled therein adjacent the walls of the cylinder, and then leads upwardly from the bottom of said coil and is coiled about the outer side of the cylinder G, and connects with the outlet pipe H'. An inner and an outer coil, indicated by $h$ and $h'$ respectively, are thus formed, which act to heat the cylinders and the space therebetween to a relatively high temperature. Around the outer coil $h'$ is placed a layer I of asbestos or other non-conducting material, and a casing or jacket J of metal or other preferred material incloses the cylinders and coils and is constructed of two sections, the meeting edges of which are provided with interfitting knuckles $j$ through which extend the pintles $j'$.

Within the hopper and supported on the cross bars $a$ is the conical deflector K which covers the top of the inner cylinder and coil $h$, and acts not only to direct the grain into the space between the cylinders but to evenly distribute it thereto. Said deflector is provided with offset portions $k$ and $k'$ which cover the shaft D and the steam pipes where they cross the space between the cylinders and prevent the grain from becoming lodged thereon.

Beneath the cylinder G and opening therefrom is the discharge hopper L which is in the shape of an inverted cone and is provided at its lower end with a slightly bell shaped outlet $l$. Said hopper L may be secured in place in any preferred manner but as shown it is provided at its top with hooks $l'$ which engage over the bars $a'$ and hold it in place. Said outlet is controlled by an outlet valve $l^2$, which is in the form of a ball and fits therein, and is supported on an adjusting bolt $l^3$ which is engaged at its upper end to a bracket $l^4$ engaged in the hopper. Said bolt passes through the valve, which is slidable thereon, and is screw threaded on its lower end and provided with an adjusting nut $l^5$ by means of which the valve may be raised or lowered to regulate the size of the discharge opening.

For the purpose of preventing the grain from entering the lower part of the cylinder C and coming in contact with the steam coil $h$, a plate M is engaged to the bars $a'$ beneath said cylinder by means of catches $m$ which are pivoted to the bars and when the plate is in place are adapted to be turned beneath the same, thereby supporting it in position and completely closing the lower end of the cylinder.

The operation is as follows: Steam is turned into the coils through the pipe H and the cylinders are brought up to the desired temperature. The cylinder C is then set in motion by the rotation of the shaft D and the grain is turned into the hopper F onto the top of the deflector K which acts to distribute it evenly into the space between the cylinders. Owing to the inclination of said deflector the grain is first thrown against the cylinder G and then back to the cylinder C and alternately back and forth across the space, the projections $c$ and $g$, and the rotation of the cylinder C, aiding in the deflection. If there is but a small percentage of moisture in the grain, the valve $l^2$ is opened sufficiently to permit the grain to fall from the hopper L as fast as it comes from the cylinders. If however the percentage of moisture is such that it requires a longer time to drive it out the valve is closed until the hopper L is filled and then opened so that it will discharge at the same rate that the grain enters the hopper, thereby retaining the grain in the hopper for a considerable period while it is subjected to the heat.

Obviously a device constructed in accordance with our invention is adapted to effectually drive off the excess moisture from the grain preparatory to grinding, and obviously also many details of construction may be varied without departing from the principles of our invention.

We claim as our invention:

1. In a device of the class described the combination with an inner and an outer cylinder, each having a plurality of projections extending towards the other of means for rotating one of the same, means for heating said cylinders and the intervening space, means for distributing material evenly into the intervening space between said cylinders, a removable discharge hopper, a valve controlled outlet therefor and a removable bottom plate for the inner cylinder.

2. In a device of the class described the combination with a hopper, of concentrically arranged cylinders beneath the same each having projections extending towards the other, means for rotating one of said cylinders, a deflector in the hopper adapted to direct material between the cylinders, a heating coil for each cylinder, and a valve controlled discharge hopper beneath the cylinders.

3. In a device of the class described the combination with a hopper of a pair of cylinders beneath the same, one within the other, means for distributing grain evenly to the space between said cylinders, means for throwing the grain alternately against said cylinders as it passes therebetween, and means for heating said cylinders and the intervening space.

4. In a device of the class described the combination with a frame of a hopper thereon, an inner and an outer cylinder supported beneath said hopper, a plurality of projections on each cylinder directed towards the other cylinder, a heating coil for each cylinder, a conical deflector in said hopper adapted to direct material between said cylinders, means for rotating the inner cylinder and a valve controlled discharge hopper beneath said cylinders.

5. In a device of the class described the combination with a frame of a hopper thereon, a shaft journaled in said frame beneath the hopper, a cylinder rigidly engaged thereon, means for rotating said cylinder, steam coils for said cylinders, a deflector covering the inner cylinder and adapted to direct material into the space between said cylinders, a plate adapted to close the bottom of the inner cylinder, a discharge hopper, a restricted outlet thereon, and a vertically movable ball valve in said outlet.

6. In a device of the class described the combination with a frame having upper and lower bars thereon, a shaft journaled in said bars, a cylinder rigidly engaged on said shaft and having outwardly directed projections thereon, means adapted to rotate said shaft and cylinder, an outer cylinder having inwardly directed projections thereon, a hopper above said cylinders, a deflector in said hopper, a pipe coiled on the inner side of the inner cylinder and outer side of the outer cylinder, a plate removably engaged on the lower bars and adapted to close the bottom of the inner cylinder, a discharge hopper, means thereon adapted to engage over the lower bars and hold the hopper in place, an adjusting bolt in said discharge hopper and a ball valve thereon adapted to control the outlet.

7. In a device of the class described the combination with an outer and an inner cylinder, having projections thereon extending into the space between the cylinders, means for rotating one of said cylinders, a heating coil on the inner side of the inner cylinder and outer side of the outer cylinder, a non-heat conducting covering for the outer coil, a sectional shell surrounding said cylinders, means for directing material between the cylinders and a valve controlled discharge hopper beneath the cylinders.

8. In a device of the class described the combination with a frame of a hopper thereon, an inner and an outer cylinder supported beneath said hopper and each having projections directed towards the other, means for rotating the inner cylinder, a discharge hopper beneath said cylinders, a transverse bracket therein, a bolt extending downwardly from said bracket, a ball adjustably engaged thereon and adapted to control the outlet from the discharge hopper, a sectional shell inclosing said cylinders, interfitting knuckles on said sections and pintles engaged in said knuckles.

In testimony whereof we have hereunto subscribed our names in the presence of two witnesses.

MICHAEL KLEMENTIS.
JOHN SEBASTIAN.

Witnesses:
 B. ZEITZ,
 CARL HAERTING.